(12) United States Patent
Ryu et al.

(10) Patent No.: US 8,667,534 B2
(45) Date of Patent: Mar. 4, 2014

(54) METHOD FOR PERFORMING BROADCAST CHANNEL ZAPPING AND BROADCAST RECEIVING APPARATUS APPLYING THE SAME

(75) Inventors: Young-jun Ryu, Suwon-si (KR); Hye-jeong Lee, Seoul (KR); Jae-hong Ahn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 13/335,374

(22) Filed: Dec. 22, 2011

(65) Prior Publication Data

US 2012/0266188 A1  Oct. 18, 2012

(30) Foreign Application Priority Data

Apr. 12, 2011 (KR) .......................... 10-2011-0033900

(51) Int. Cl.
*G06F 3/00* (2006.01)
*H04N 7/16* (2011.01)
*H04N 5/50* (2006.01)

(52) U.S. Cl.
USPC ................... 725/38; 725/25; 725/27; 725/30; 348/731; 348/732

(58) Field of Classification Search
USPC ................... 725/25–30, 37–39; 348/731, 732
See application file for complete search history.

(56) References Cited

U.S. PATENT DOCUMENTS

| | | | |
|---|---|---|---|
| 5,886,746 A | 3/1999 | Yuen et al. | |
| 8,381,286 B2* | 2/2013 | Wagner et al. | 726/17 |
| 2005/0160453 A1 | 7/2005 | Kim | |
| 2008/0244646 A1 | 10/2008 | Schmelter et al. | |
| 2010/0188575 A1* | 7/2010 | Salomons et al. | 348/553 |
| 2011/0096235 A1* | 4/2011 | Chang et al. | 348/570 |
| 2012/0059953 A1* | 3/2012 | Klappert | 709/236 |
| 2012/0167126 A1* | 6/2012 | Paek et al. | 725/14 |

FOREIGN PATENT DOCUMENTS

| | | |
|---|---|---|
| EP | 1524852 A1 | 4/2005 |
| EP | 1686795 A1 | 8/2006 |
| KR | 1020050075546 A | 7/2005 |
| KR | 10-2006-0072544 A | 6/2006 |

OTHER PUBLICATIONS

Communication dated Jul. 20, 2012 from the European Patent Office in counterpart European application No. 11192754.7.

* cited by examiner

*Primary Examiner* — Hoang-Vu A Nguyen-Ba
(74) *Attorney, Agent, or Firm* — Sughrue Mion, PLLC

(57) ABSTRACT

A channel zapping method is provided. The channel zapping method includes setting a channel group selected from among a plurality of channel groups classified by genre as a target for group zapping, and if a channel zapping command is input, performing channel zapping to a next channel in the channel group to which a current channel belongs, and if a group zapping command is input, performing channel zapping to a channel in another channel group included in the target for group zapping, and the another channel group is a channel group in a highest class or in a sub class which belongs to the highest class in the each genre.

28 Claims, 17 Drawing Sheets

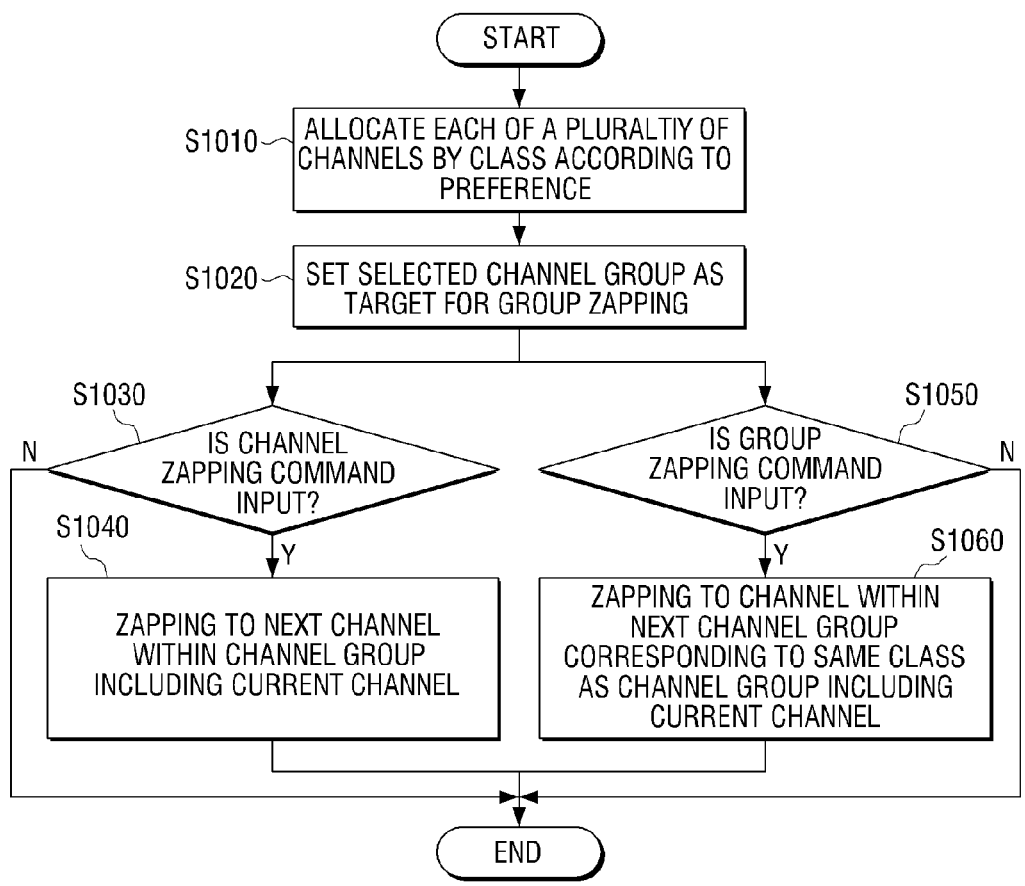

METHOD FOR PERFORMING BROADCAST CHANNEL ZAPPING AND BROADCAST RECEIVING APPARATUS APPLYING THE SAME

CROSS-REFERENCE TO RELATED APPLICATION

This application claims priority from Korean Patent Application No. 10-2011-0033900, filed in the Korean Intellectual Property Office on Apr. 12, 2011, the disclosure of which is incorporated herein by reference.

BACKGROUND

1. Field

Methods and apparatuses consistent with the exemplary embodiments relate to a method for zapping or changing a channel and a broadcast receiving apparatus applying the same, and more particularly, to a method for zapping a channel by performing grouping zapping of a plurality of channel groups and a broadcast receiving apparatus applying the same.

2. Description of the Prior Art

Recently, with the development of various multi-media apparatuses, a user may watch various broadcast programs anywhere and anytime. In addition, with the development of various contents which are provided through broadcast channels, the number of broadcast channels that a user may choose has also increased.

A user uses various ways to change a channel, and one of the most frequently used methods for changing a channel is a sequential search method using a channel up/down command. That is, a user changes channels sequentially, checks programs broadcast through each channel, and then selects a desired channel.

However, as the number of broadcast channels increases, it may take a considerable amount of time for a user to select a desired channel using such a sequential search method. Therefore, a method which allows a user to select a channel easily by classifying and providing channels according to a certain criteria is required.

SUMMARY

An aspect of the exemplary embodiments relates to a method for zapping or changing a channel by performing group zapping of a plurality of channel groups by genre and outputting a channel within a selected channel group, and a broadcast receiving apparatus applying the same.

A method for performing channel zapping, according to an exemplary embodiment, includes setting a channel group selected from among a plurality of channel groups classified by genre as a target for group zapping, and if a zapping command to perform channel zapping is input, performing zapping to a next channel in a channel group to which a current channel belongs, and if a group zapping command to perform channel group zapping is input, performing channel zapping to a channel in another channel group included in a target for group zapping, and the another channel group is a channel group in a highest class or in a sub class which belongs to the highest class in the each genre.

The setting may include, if a selection command is input while a user is watching a channel, setting a channel group to which a current channel belongs as the target for group zapping.

The setting may include displaying a group selection screen indicating a channel group name in a highest class and a channel group name in at least one of sub classes in each group and setting a channel group selected from the group selection screen as the target for group zapping.

The setting may further include performing user authentication and setting predetermined channel groups as the target for group zapping according to an authenticated user.

The group zapping command may include a first group zapping command to perform group zapping in a first direction and a second group zapping command to perform group zapping in a second direction which is opposite to the first direction, and the zapping may include, if the first group zapping command or the second group zapping command is input, selecting another channel group which is in a direction corresponding to an input group zapping command within in the target for group zapping and performing zapping to channel in the another channel group.

The group zapping command may be generated based on movement information of an external input apparatus.

The method may further include displaying an image corresponding to a channel selected according to at least one of the zapping command and the group zapping command on a screen, and at least one of class and genre to which the selected channel belongs is displayed on one portion of the screen.

A method for performing channel zapping, according to another exemplary embodiment, includes receiving a user's command to select a channel group from among a plurality of channel groups classified by genre, and if a channel zapping command is input, performing zapping to a next channel in a channel group to which a current channel belongs, and if a group zapping command is input, performing channel zapping to a channel in another channel group in a same class as the selected channel group, and the another channel group is a channel group in a sub class which belongs to the highest class in the each genre.

The receiving a user's command, may further include receiving a user's voice to select at least one channel group from among the plurality of channel groups, the zapping may include, if a group zapping command is input, performing zapping to a channel in another channel group in a same class as a channel group selected by the user's voice.

The group zapping command may include a first group zapping command to perform group zapping in a first direction and a second group zapping command to perform group zapping in a second direction which is opposite to the first direction, and the zapping may include, if the first group zapping command or the second group zapping command is input, selecting another channel group which is in a direction corresponding to an input group zapping command within in a same class in each genre and performing zapping to channel in the another channel group.

A broadcast receiving apparatus, according to an exemplary embodiment, includes a receiving unit which selects a broadcast channel and receives a broadcast signal, an input unit which receives a user's command, a setting unit which sets a channel group selected from among a plurality of channel groups classified by genre as a target for group zapping, and a control unit which controls the receiving unit to select a next channel in a channel group to which a current channel belongs if a zapping command to perform channel zapping is input, and to select a channel in a next channel group included in a target for group zapping if a group zapping command to perform channel group zapping is input, and the another channel group is a channel group in a highest class or in a sub class which belongs to the highest class in each genre.

The setting unit, if a selection command is input while a user is watching a channel, may set a channel group to which a current channel belongs as the target for group zapping.

The apparatus may further include a display unit which displays a group selection screen indicating a channel group name in a highest class and a channel group name in at least one of sub classes in each group and the setting unit may set a channel group selected from the group selection screen as the target for group zapping.

The control unit may control the setting unit to perform user authentication and set predetermined channel groups as the target for group zapping according to an authenticated user.

The group zapping command may include a first group zapping command to perform group zapping in a first direction and a second group zapping command to perform group zapping in a second direction which is opposite to the first direction, and the control unit may control the receiving unit to select another channel group which is in a direction corresponding to an input group zapping command within in the target for group zapping and perform zapping to channel in the next channel group if the first group zapping command or the second group zapping command is input.

The input unit may receive the group zapping command which is generated based on movement information of an external input apparatus.

The apparatus may further include a display unit which displays an image corresponding to a channel selected according to at least one of the zapping command and the group zapping command on a screen, and the control unit may control the display unit to display at least one of class and genre to which the selected channel belongs on one portion of the screen.

A broadcast receiving apparatus, according to another exemplary embodiment, includes a receiving unit which selects a broadcast channel and receives a broadcast signal, an input unit which receives a user's command to select a channel group from among a plurality of channel groups classified by genre, and a control unit which controls the receiving unit to select a next channel in a channel group to which a current channel belongs if a channel zapping command is input, performs zapping, and to select to a channel in another channel group in a same class as the selected channel group if a group zapping command is input, and the another channel group is a channel group in a sub class which belongs to the highest class in the each genre.

The apparatus may further include the input unit which receives a user's voice to select at least one channel group from among the plurality of channel groups, and the control unit, if a group zapping command is input, may control the receiving unit to select a channel in another channel group in a same class as a channel group selected by the user's voice.

The group zapping command may include a first group zapping command to perform group zapping in a first direction and a second group zapping command to perform group zapping in a second direction which is opposite to the first direction, and the control unit, if the first group zapping command or the second group zapping command is input, may control the receiving unit to select another channel group which is in a direction corresponding to an input group zapping command within in a same class in each genre and select a channel in the another channel group.

A method for performing channel zapping, according to another exemplary embodiment, includes allocating each of a plurality of channels to a plurality of channel groups classified by genre according to a user's preference, setting a channel group selected from among the plurality of channel groups by a user as a target for group zapping, and if a zapping command to perform channel zapping is input, performing zapping to a next channel in a channel group to which a current channel belongs, and if a group zapping command to perform channel group zapping is input, performing channel zapping to a channel in another channel group included in the target for group zapping.

The allocating may include analyzing context information of a user and determining the user's preference regarding each of the plurality of channels.

The context information may include at least one of viewing history information or usage history information regarding a broadcast receiving apparatus.

A broadcast receiving apparatus, according to another exemplary embodiment, includes a receiving unit which selects a broadcast channel and receives a broadcast signal, an input unit which receives a user's command, a setting units which allocates each of a plurality of channels to a plurality of channel groups classified by genre according to a user's preference and sets a channel group selected from among the plurality of channel groups by a user as a target for group zapping, and a control unit which controls the receiving unit to select a next channel in a channel group to which a current channel belongs if a zapping command to perform channel zapping is input, and to select a channel in a next channel group included in the target for group zapping if a group zapping command to perform channel group zapping is input.

The setting unit may analyze context information of a user and determine the user's preference regarding each of the plurality of channels.

The context information may include at least one of viewing history information or usage history information regarding a broadcast receiving apparatus.

According to various exemplary embodiments, a channel group may be selected from among a plurality of channel groups classified by genre and only a channel within the selected channel group may be selected and watched. In addition, only a channel in a channel group to which a current channel belongs or in a channel group in a same class as a channel group selected by a user may be selected and watched. Therefore, a user may select a desired channel easily in a short period of time.

BRIEF DESCRIPTION OF THE DRAWINGS

The above and/or other aspects of the present disclosure will be more apparent by describing certain exemplary embodiments with reference to the accompanying drawings, in which:

FIG. 10 is a flowchart to explain a method for performing group zapping according to another exemplary embodiment.

DETAILED DESCRIPTION

Figure 1:
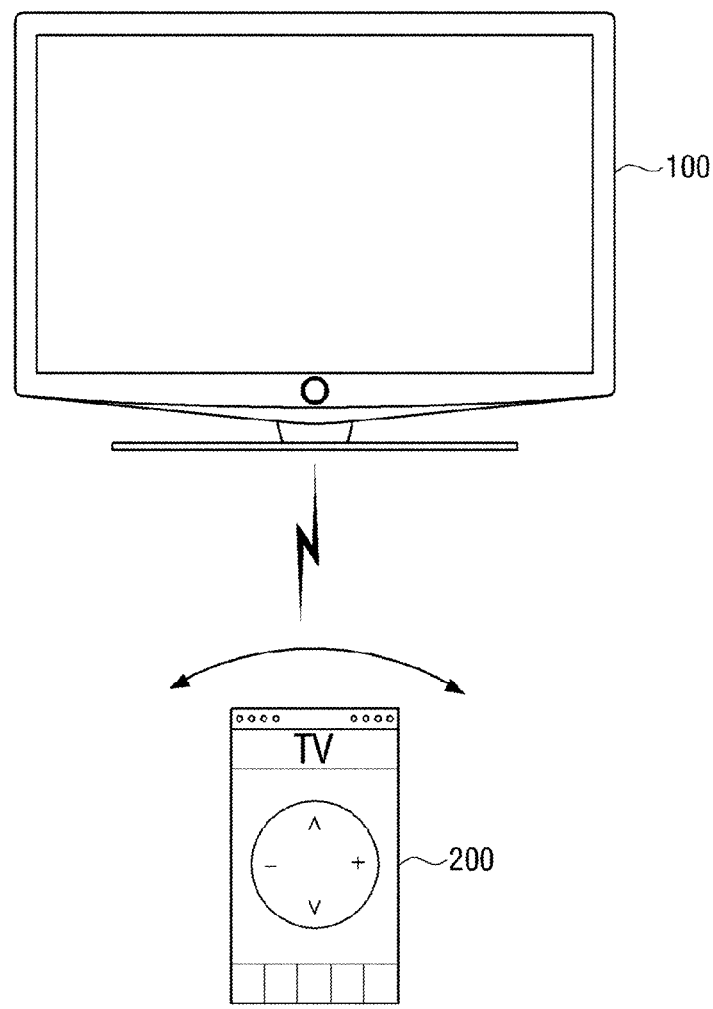
FIG. 1 is a view to explain a broadcast receiving system according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view to explain a broadcast receiving system according to an exemplary embodiment. As illustrated in FIG. 1, the broadcast receiving system includes a broadcast receiving apparatus 100 and an external input apparatus 200 to input a user's command to the broadcast receiving apparatus 100.

The broadcast receiving apparatus 100 has a general mode in which a channel is searched and selected according to a general method and a zapping mode in which a channel is searched and selected according to a predetermined method. Herein, the zapping mode may include group zapping in which zapping is performed by predetermined channel group and channel zapping in which zapping is performed within a specific channel group. Hereinafter, it is assumed that the broadcast receiving apparatus 100 operates in the channel zapping mode for convenience of explanation.

Specifically, the broadcast receiving apparatus 100 may set a channel group selected from among a plurality of channel groups which are classified by genre as a target for group zapping and perform group zapping within the targeted channel group for group zapping.

In addition, the broadcast receiving apparatus 100 may perform channel zapping within one channel group from among a plurality of channel groups according to a channel zapping command. Herein, the channel group is a group of selectable broadcast channels which are categorized by genre and at least one broadcast channel may be included in each channel group. Another channel group may be a group of channels which belong to the uppermost class in each genre or a group of channels which belong to a sub class in the uppermost class.

Meanwhile, the broadcast receiving apparatus 100 may allocate each of a plurality of channels to a plurality of channel groups which are classified by genre according to a user's preference.

The broadcast receiving apparatus 100 which performs the above function provides a broadcast received through a cable or wirelessly to a user by displaying the broadcast on a display. In addition, the broadcast receiving apparatus 100 may not only provide an input received from an external apparatus through a cable or wirelessly to a user by displaying it on a display, but also reproduce a file (video file, still image file, music file, and etc.) stored in an internal storage medium and provide it to a user.

As described above, the broadcast receiving apparatus 100 is an apparatus which may receive and output a broadcast signal, and may be embodied as a digital television. However, the broadcast receiving apparatus 100 is not limited thereto and may be any apparatus capable of receiving broadcast signal such as mobile phone, PMP, MP3, and PC.

The external input apparatus 200 (for example, a remote controller) transmits a user's manipulation to control an operation of the broadcast receiving apparatus 100. To do so, the external input apparatus 200 may include a power button, a number button, a channel button (channel up button/channel down button) and sound adjustment button, and may be embodied as a touch screen.

In particular, the external input apparatus 200 transmits a command generated based on movement information to the broadcast receiving apparatus 100 to control a specific operation of the broadcast receiving apparatus 100.

Specifically, the external input apparatus 200 generates a control signal based on movement information obtained through an internal sensor (for example, a gyro sensor, an acceleration sensor, a geomagnetic sensor, and etc.) and transmits the generated control signal to the broadcast receiving apparatus 100 to control an group zapping operation of the broadcast receiving apparatus 100.

For example, if the front side of the external input apparatus 200 moves fast in the first direction, the output of the external input apparatus 100 corresponds to the first group zapping command in which group zapping is performed in the first direction.

If the front side of the external input apparatus 200 moves fast in the second direction which is opposite to the first direction, the output of the external input apparatus 200 corresponds to the second group zapping command in which group zapping is performed in the second direction.

Accordingly, if the first group zapping command or the second group zapping command is input to the broadcast receiving apparatus 100, the broadcast receiving apparatus 100 may select another channel group, that is, the previous channel group or the next channel group, corresponding to the direction of the input group zapping command and select a channel within the corresponding channel group in the target range for group zapping.

Meanwhile, in the above exemplary embodiment, the external input apparatus 200 generates a control signal to control the group zapping operation of the broadcast receiving apparatus 100, but this is only an example. A sensing unit (for example, a photographing apparatus) formed in the broadcast receiving apparatus 100 may sense the movement of the external input apparatus 200 and directly generate a control signal to control the group zapping operation of the broadcast receiving apparatus accordingly.

Figure 2:
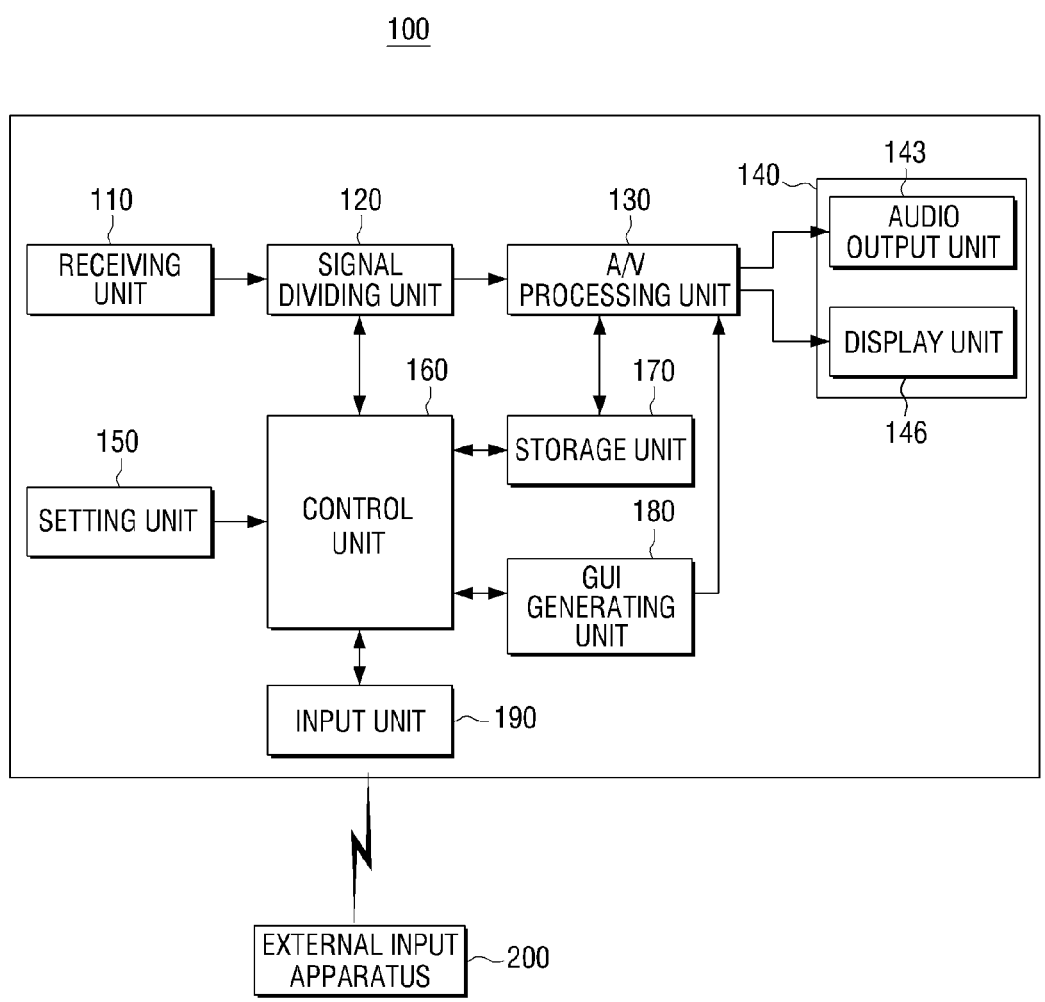
FIG. 2 is a block diagram to explain configuration of a broadcast receiving apparatus according to an exemplary embodiment.

FIG. 2 is a block diagram to explain configuration of the broadcast receiving apparatus 100 according to an exemplary embodiment. Referring to FIG. 2, the broadcast receiving apparatus 100 comprises a receiving unit 110, a signal dividing unit 120, an A/V processing unit 130, an output unit 140, a setting unit 150, a control unit 160, a storage unit 170, a GUI generating unit 180, and an input unit 190.

The receiving unit 110 receives a broadcast from a broadcast station or a satellite through a cable or wirelessly and demodulates the received broadcast. Specifically, the receiving unit 110 may be embodied as at least one tuner. In some cases, the receiving unit 110 may have a plurality of tuners and receive broadcast signals from a plurality of channels at the same time.

The signal dividing unit 120 divides a broadcast signal into a video signal, an audio signal and broadcast information. The signal dividing unit 120 transmits the video signal and the audio signal to the A/V processing unit 130 and the broadcast information to the storage unit 170, the control unit 160, and the GUI generating unit 180.

The A/V processing unit 130 performs signal processing such as video decoding, video scaling, and audio decoding on the video signal and the audio signal input from the signal dividing unit 130 and an interface unit (not shown). In addition, A/V processing unit 130 outputs an image signal to the display unit 146 and audio signal to the audio output unit 143.

Meanwhile, if a video signal and an audio signal are to be stored in the storage unit 170 or transmitted to an external apparatus through an interface unit (not shown), the A/V processing unit 130 outputs the video signal and the audio signal to the storage unit 170 or the interface unit (not shown) in a compressed form.

The setting unit 150 may set a selected group from among a plurality of channel groups which are classified by genre or a plurality of channel groups which are classified by genre according to a user's preference as a target for group zapping.

Specifically, if a selection command is input while a user is watching a channel, the setting unit 150 may set a channel group to which the current channel belongs as a target for group zapping, or may set a channel group selected by a user on a group selection screen as a target for group zapping. Such a method for setting a target for group zapping will be explained in detail with reference to a relevant drawing.

Herein, the target for group zapping may refer to a group of channels for which group zapping is performed in response to a command to perform channel group zapping.

The input unit 190 receives a user's manipulation (for example, a channel zapping command and a group zapping command) and may be embodied as a manipulation panel (for example, a touch screen) including a text button, number button, a channel search button (channel up/down button, a group zapping button), a sound adjustment button, and a selection button. Alternatively, the input unit 190 may operate as a remote control receiving unit to receive an operation of the external input apparatus 200.

In particular, the input unit 190 may receive a user's command to select at least one channel group from among a plurality of channel groups. In this case, the user's command may be a command to include a selected channel group in a target range for group zapping or a command to select a channel group for performing group zapping between channel groups of the same class. To do so, the input unit 190 may have a button to select a channel group, include a speaker, and receive a user's voice to select a specific channel group.

In addition, the input unit 190 may receive user authentication information. To do so, the input unit 190 may have a button (for example, a number button or a text button) for inputting a user identification (ID) and password, or may receive user authentication information from the external input apparatus 200.

Subsequently, the input unit 190 transmits the input user manipulation to the control unit 160.

The control unit 160 identifies a user's command based on the user manipulation transmitted from the input unit 190 and controls overall operation of the broadcast receiving apparatus 100 according to the identified user command.

In particular, the control unit 160 may classify broadcast channels into a plurality of channel groups based on various information included in broadcast information. That is, the control unit 160 may classify selectable broadcast channels by genre based on genre information included in a broadcast signal which is received through each channel and classify broadcast channels included in each genre into sub classes according to predetermined classification criteria. Herein, the genre may be at least one of news, movie, drama, variety, sports, education, entertainment, religion, information and culture, and the predetermined classification criteria includes detailed genre (for example, horror, melodrama, action, and etc.), rating, type, broadcast time (for example, weekday or weekend), and region, and the criteria may be applied differently for each genre.

In addition, the control unit 160 allocates each of a plurality of channels to a plurality of channel groups classified by genre according to a user's preference. That is, the control unit 160 may generate a plurality of channel groups by classifying a plurality of channels which are preferred by a user by genre so that only those channels preferred by the user may be included in the plurality of channel groups classified by genre. For example, the channels preferred most by a user may be allocated to a channel group in a lower class, and the channels preferred least by the user may be allocated to a channel group in higher class or the highest class. Accordingly, a plurality of channel groups reflecting a user's preference may be generated.

Specifically, the control unit 160 may perform authentication of a user, determine preferred channels by analyzing context information of the authenticated user, and generate a plurality of channel groups by classifying the determined preferred channels by genre.

Herein, the context information includes viewing history information or usage history information regarding a broadcast receiving apparatus of a user. Specifically, the viewing history information may refer to information regarding a broadcast channel watched by a user and information regarding a time during which a specific broadcast channel is watched for a predetermined period of time (for example, a time during which power is provided to a broadcast receiving apparatus). The usage history information may include not only viewing history but also a time of using contents and additional services and information regarding a corresponding content and service. More specifically, the usage history information may include a content downloaded from an external server by a user, information regarding an internet site connected by a user and social networking service (SNS) usage information.

In this case, the control unit 160 may analyze a content downloaded by a user and an internet site connected by a user, and may determine a preferred broadcast channel based on the analysis.

For example, if a user connects to an internet site through the broadcast receiving apparatus 100 to purchase a product related to 'baseball' and download a 'music file', the channels related to 'baseball' and 'music' may be determined as preferred channels and those channels may be classified as separate channel groups.

The control unit 160 may control the setting unit 150 to set channel groups selected from among a plurality of channel groups classified by genre as a target for group zapping.

The control unit 160 may control the receiving unit 110 to select a channel according to a zapping command to perform channel zapping or a group zapping command to perform channel group zapping.

Specifically, if a zapping command to perform channel zapping is input, the control unit 160 may select another channel in a channel group to which a current channel belongs. That is, the control unit 160 may select the previous channel or the next channel in a channel group to which a current channel belongs according to manipulation of channel up/down buttons formed in the external input apparatus 200.

In addition, if a command to perform group zapping to perform channel group zapping is input, the control unit 160 may select a channel in another channel group included in the target for group zapping. Herein, the another channel group may a channel group in the highest class or the lowest class in each genre.

That is, the control unit 160 may select a channel in the next channel group or in the previous channel group within the target for group zapping according to a first group zapping command or a second group zapping command which is generated based on movement information.

In addition, if a group zapping command to perform channel group zapping is input, the control unit 160 may control the receiving unit to select a channel in another channel group in the same class as a channel group to which a current channel belongs or a channel group selected by a user. In this case, the another channel group may be a channel group in a sub class which belongs to the highest class in each genre and channel group zapping between channel groups in a channel group included in the same class may be performed within the same genre. Therefore, it is desirable that a channel group selected by a user is a channel group in a sub class which belongs to the highest class in each genre.

That is, the control unit 160 may select a channel in the next channel group or in the previous channel group in the same class as a channel group to which a current channel belongs or a channel group selected by a user according to a first group zapping command or a second group zapping command which is generated based on movement information by the external input apparatus 200.

The control unit 160 may perform authentication of a specific user by comparing authentication information input through the input unit 190 and authentication information pre-stored in the storage unit 170 and set a predetermined channel groups as a target for group zapping according to the authenticated user. Herein, the authentication information may represent user identification and password. In addition, the control unit 160 may control to perform group zapping between a predetermined channel groups and other channel groups included in the same class in each genre according to the authenticated user.

The output unit 140 includes an audio output unit 143 and a display unit 146.

The audio output unit 143 may output audio output from the A/V processing unit 130 through a speaker or may output audio to an external apparatus (for example, an external speaker) through an external output terminal.

The display unit 146 displays an image output from the A/V processing unit 130 on a screen. That is, the display unit 136 may display an image corresponding to a broadcast signal received from a selected channel according to at least one of a zapping command and a group zapping command.

In addition, the display unit 146 may display menus generated from the GUI generating unit 180 on a screen.

Specifically, the display unit 146 may display a group selection screen indicating a channel group name in the highest class and a channel group name in at least one of the sub classes in each group. In addition, the display unit 146 may display an image corresponding to a broadcast channel and a channel group and a broadcast channel number corresponding to broadcast channel in one portion of the screen simultaneously.

The storage unit 170 stores information regarding various broadcast programs.

Specifically, the storage unit 170 may store information regarding a plurality of channel groups classified by genre and information regarding a target for group zapping comprising channel groups selected from among a plurality of channel groups.

In addition, the storage unit 170 may store context information regarding an authenticated user and information regarding a plurality of channel groups classified by genre according to a user's preference.

Furthermore, the storage unit 170 may store authentication information for authenticating a user and information regarding channel groups which are predetermined according to an authenticated user.

The GUI generating unit 180 generates a GUI to be displayed on a screen and adds the generated GUI to an image output from the A/V processing unit 130.

In particular, the GUI generating unit 180 may generate a GUI which represents a group selection screen indicating a channel group name in the highest class and a channel group name in at least one of the sub classes in each group and a GUI which represents a channel group and a broadcast channel number of a currently-display broadcast channel.

Figure 3A:
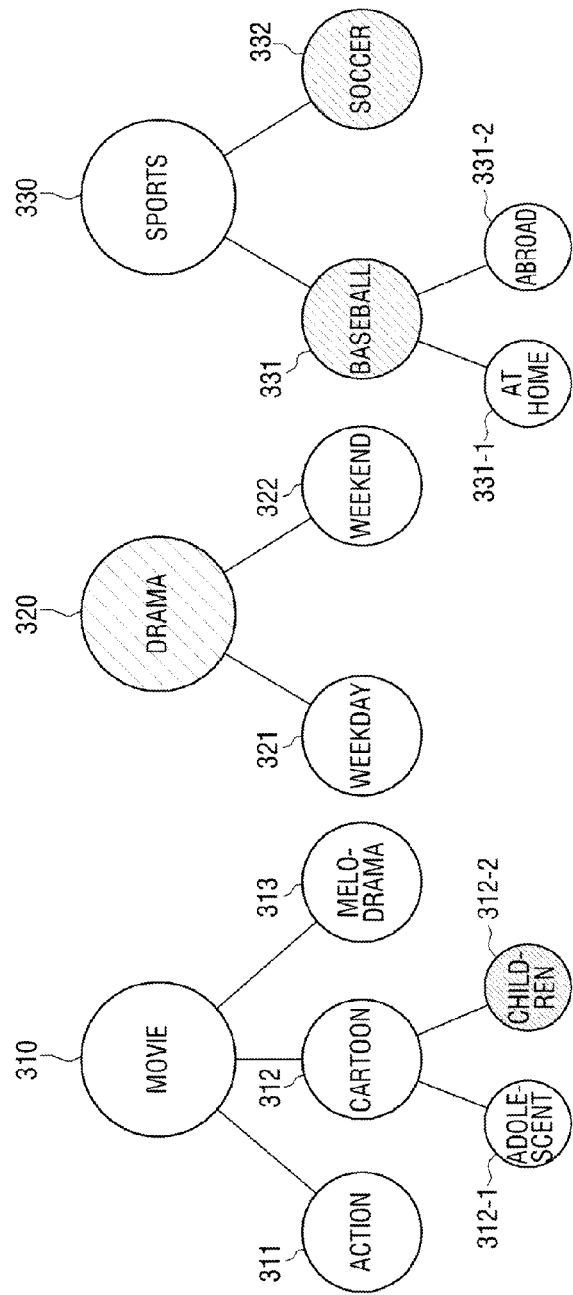
FIGS. 3A and 3B are views to explain a method for performing group zapping by a broadcast receiving apparatus according to an exemplary embodiment.
Figure 3B:
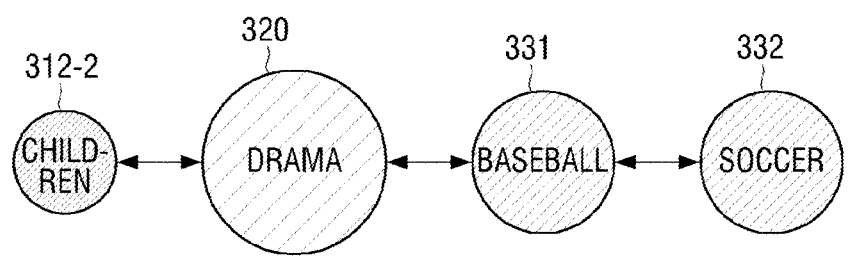

FIGS. 3A and 3B are views to explain a method for performing group zapping by a broadcast receiving apparatus according to an exemplary embodiment. Referring to FIG. 3A, a plurality of channel groups which are classified by genre are illustrated.

Specifically, the control unit (160 of FIG. 2) may classify selectable broadcast channels into a movie channel group 310, a drama channel group 320, and a sport channel group 330 based on genre information included in broadcast information, and the broadcast channels are included in the highest class in each genre.

In addition, the control unit (160 of FIG. 2) may classify broadcast channels in the movie channel group 310 into an action movie channel group 311, a cartoon movie channel group 312, and a melodrama movie channel group 313. In addition, broadcast channels in a cartoon movie channel group 312 may be classified into an adolescent cartoon movie channel group 312-1 and a child cartoon movie channel group 312-2 according to a viewing grade.

Furthermore, the control unit (160 of FIG. 2) may classify broadcast channels in the drama channel group 320 into a weekday channel group 321 and a weekend drama channel group 322 according to a broadcast time.

The control unit (160 of FIG. 2) may also classify broadcast channels in the sport channel group 330 into a baseball channel group 331 and a soccer channel group 332 according to type of broadcast channels. In addition, the broadcast channels in the baseball channel group 331 may be classified into a domestic baseball channel group 331-1 and an overseas baseball channel group 331-2 according to a region.

In this case, sub classes 311, 312, 313, 321, 322, 331, 332 of channel groups 310, 320, 33 in the highest class may correspond to the same first class. In addition, sub classes 312-1, 312-2, 331-1, 331-2 of channel groups in the first class 311, 312, 313, 321, 322, 331, 332 may correspond to the same second class.

Meanwhile, referring to FIG. 3A, 'the child cartoon movie channel group 312-2', 'the drama channel group 320', 'the baseball channel group 331' and 'the soccer channel group 332' selected by a user are included in a target for group zapping.

FIG. 3B is a view to explain that group zapping is performed within a target for group zapping when a group zapping command is input. As illustrated in FIG. 3B, if a first group zapping command is executed in sequence while a user is watching a channel in 'the child cartoon movie channel group 312-2', a channel included in 'the drama channel group 320', a channel included in 'the baseball channel group 331', and a channel included in 'the soccer channel group 332' may be selected. Likewise, if a second group zapping command is executed in sequence, a channel included in 'the soccer channel group 332', a channel included in 'the baseball channel group 331' and a channel included in 'the drama channel group 320' may be selected.

As such, according to the exemplary embodiment, channel zapping between channel groups in different genres and different classes may be performed.

FIGS. 4A to 4D are views to explain an operation of a broadcast receiving apparatus performing channel zapping and group zapping in detail according to an exemplary embodiment. It will be assumed that a target for group zapping is set as in FIGS. 3A and 3B.

Figure 4A:
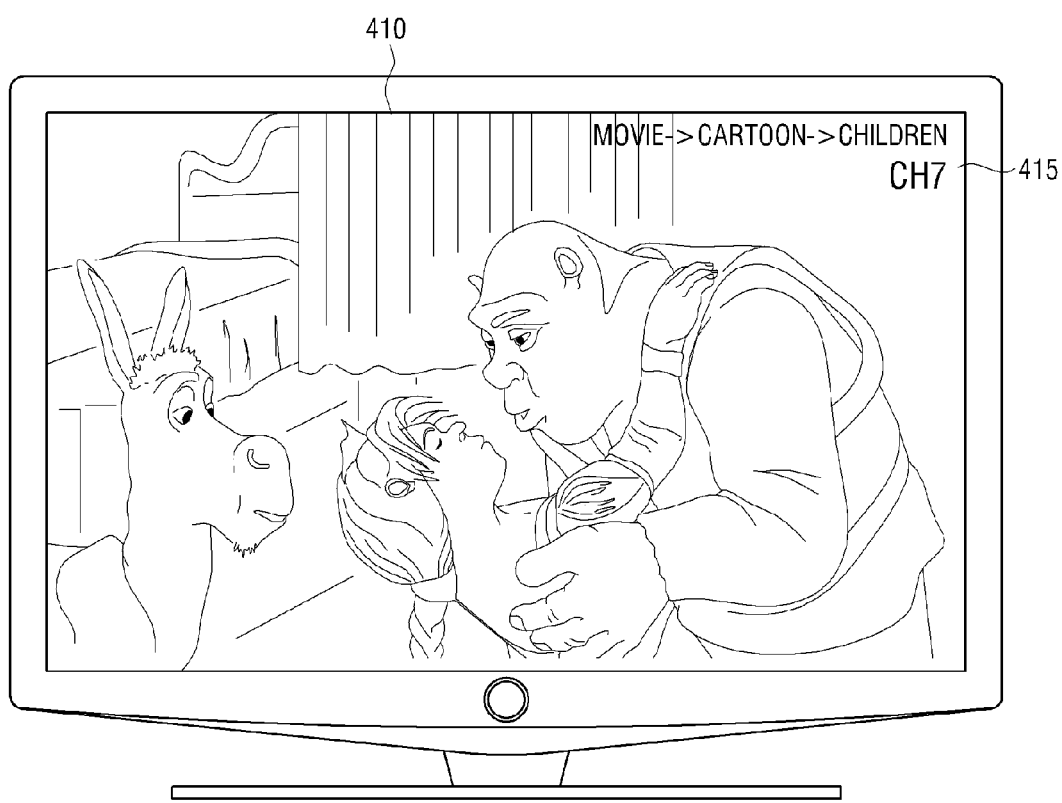
FIGS. 4A to 4D are views to explain an operation of a broadcast receiving apparatus performing channel zapping and group zapping in detail according to an exemplary embodiment.

As illustrated in FIG. 4A. a channel in 'the child cartoon movie channel group' included in a target for group zapping may be selected, a corresponding image 410 may be displayed on a screen, and at least one of class and genre of the selected channel may be displayed on one portion of the screen. Accordingly, a user may recognize that the selected channel is included in 'the child cartoon movie channel group' in a cartoon movie channel group of a movie channel group.

Figure 4B:
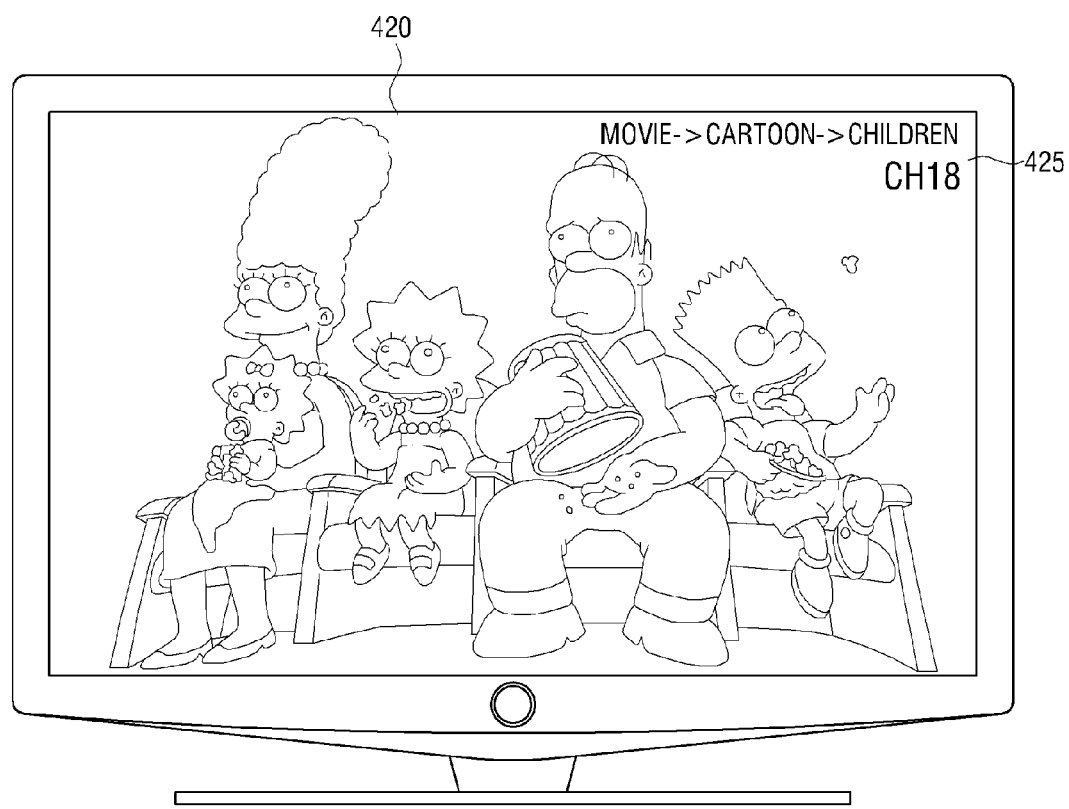

FIG. 4B is a view illustrating a case where a user who is watching an image such as the one illustrated in FIG. 4A inputs a zapping command to perform channel zapping. As illustrated in FIG. 4B, another channel in 'the child cartoon movie channel group', that is, a channel group to which a current channel belongs is selected and an image corresponding to the selected channel is displayed on the screen 420. As channel zapping is performed in the same channel group, 'movie→cartoon→child' is displayed on the upper right portion 425 of the screen, but it can be seen that the channel is changed from CH7 to CH18.

Figure 4C:
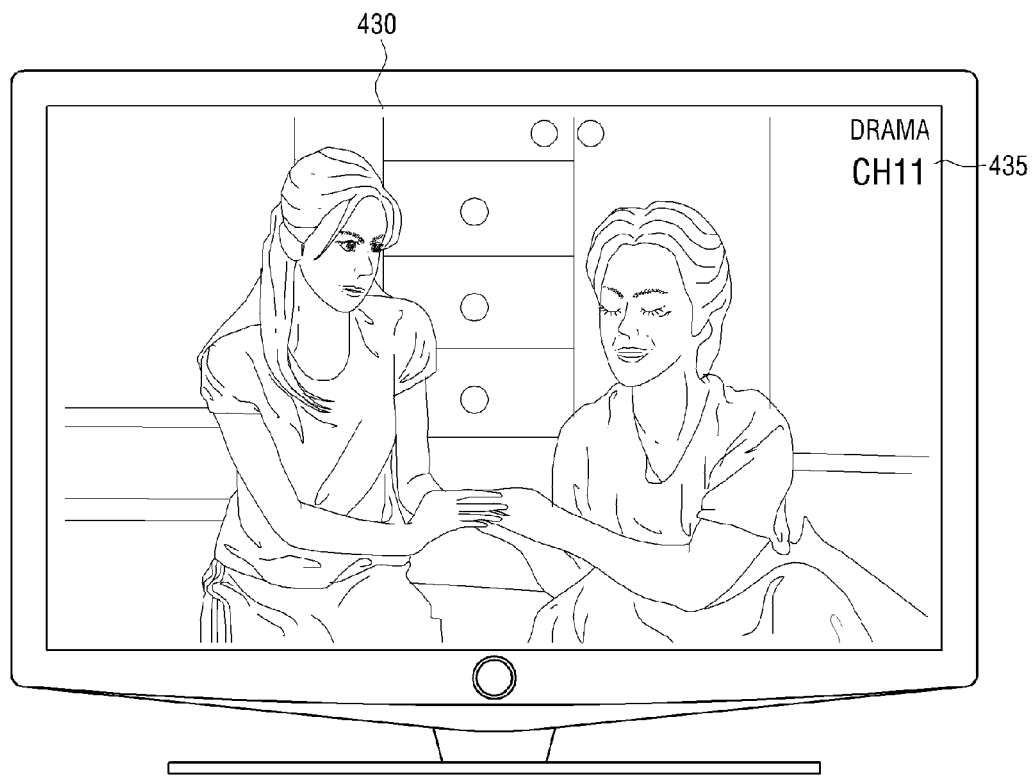

FIG. 4C is a view illustrating a case where a group zapping command is input while a user is watching a channel such as the one illustrated in FIG. 4A or FIG. 4B. As illustrated in FIG. 4C, another channel group within a target for group zapping, that is, a channel in 'the drama channel group' is selected and an image corresponding to the received broadcast signal is displayed on the screen 430 according to the group zapping command. As group zapping is performed, 'drama' which corresponds to the changed channel group is displayed on the upper right portion 435 of the screen along with the channel number which in this case is CH11.

Figure 4D:
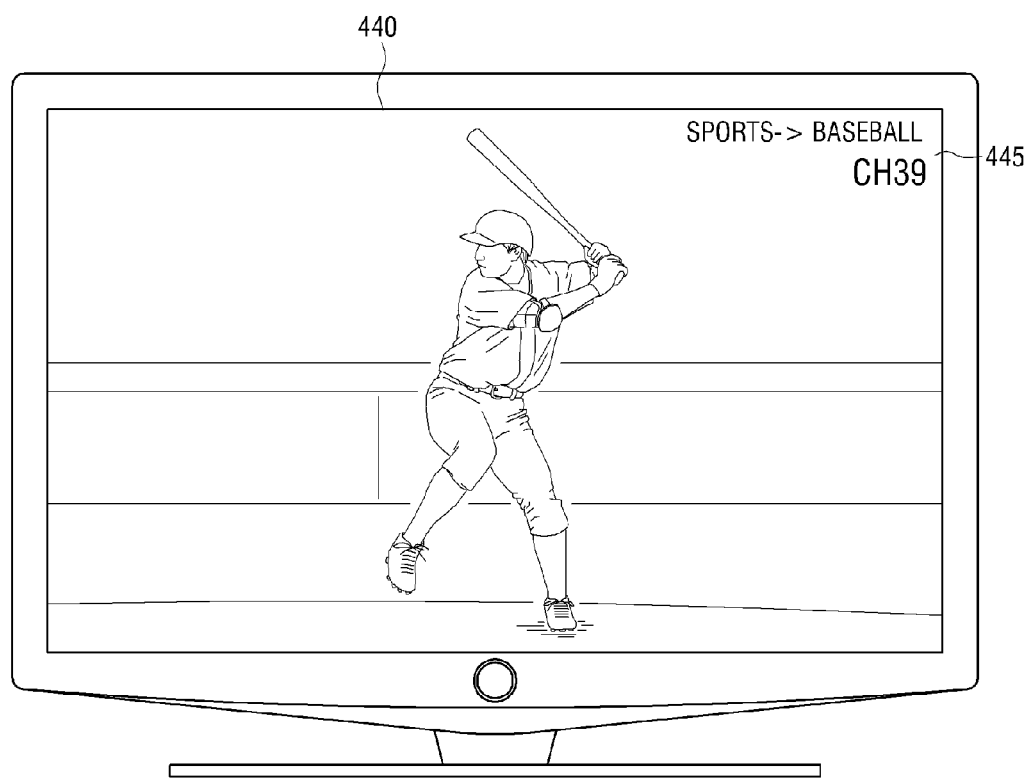

FIG. 4D is a view illustrating a case where a group zapping command is input while a user is watching a channel such as the one illustrated in FIG. 4C. As illustrated in FIG. 4D, another channel group within a target for group zapping, that is, a channel in 'the baseball channel group' is selected and an image corresponding to the received broadcast signal is displayed on the screen 440. As group zapping is performed, 'baseball channel group' which corresponds to the changed channel group is displayed on upper right portion 445 of the screen along with the channel number, in this case CH39.

As such, the broadcast receiving apparatus according to the exemplary embodiment may perform channel zapping between channel groups in different classes and different genres and also display information regarding a group to which a current channel belongs on one portion of the screen.

Figure 5A:
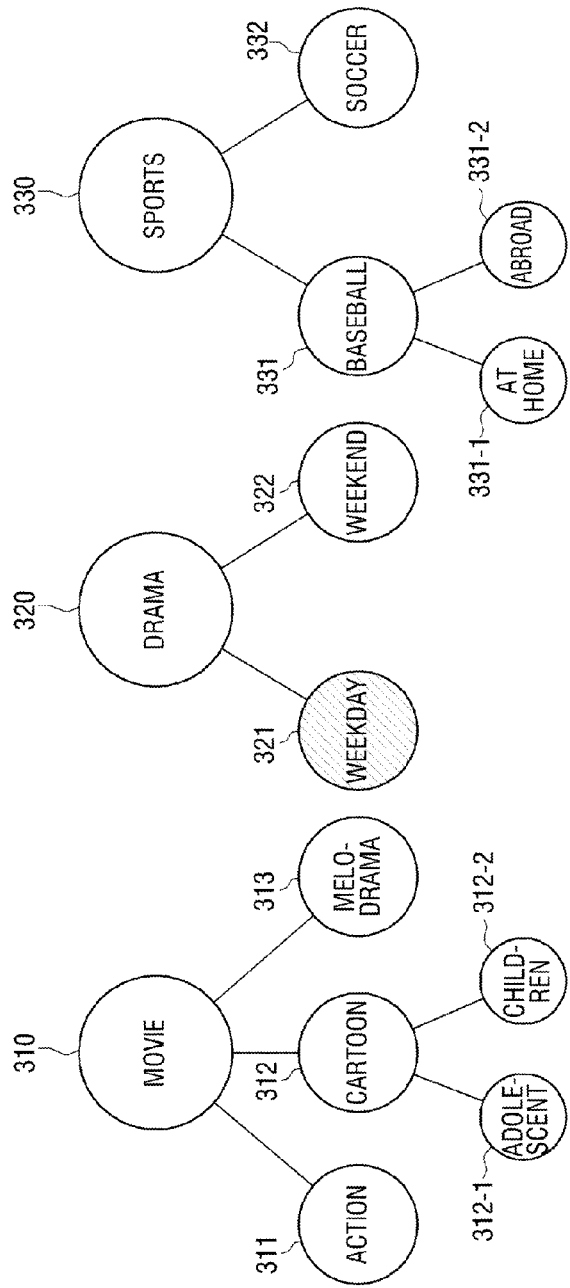
FIGS. 5A and 5B are views to explain a method for performing group zapping by a broadcast receiving apparatus according to another exemplary embodiment.
Figure 5B:
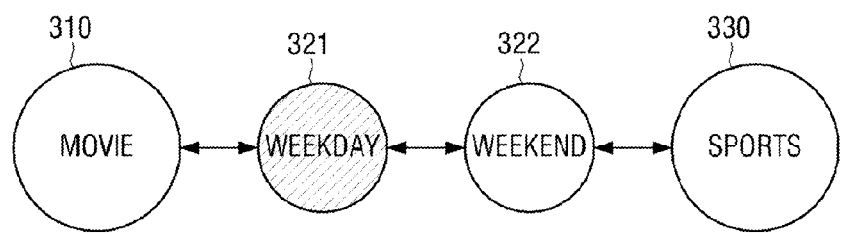

FIGS. 5A and 5B are views to explain a method for performing group zapping by a broadcast receiving apparatus according to another exemplary embodiment.

In FIG. 5A, it is assumed that a user selects 'the weekday drama channel group 321' through an input unit (190 of FIG. 2), which is different from a case of FIG. 3A in which a channel group is included in a target for group zapping.

Subsequently, if a group zapping command is input, a channel in another channel group which belongs to the same class as the selected channel group in each genre may be selected. Herein, the another channel group may be a channel group in a sub class which belongs to the highest class in each genre.

As illustrated in FIG. 5B, if a first group zapping command is input while a user is watching one broadcast channel included in 'the weekday drama channel group 321' selected by the user, a channel in 'the weekend drama channel group 322' which is in the same class as the corresponding group 320 may be selected. Subsequently, if a second group zapping command is input, one of channels included in 'the sport channel group 330' which is the highest class of 'the baseball channel group 331', may be selected.

Likewise, if a third group zapping command is input, one of channels included in 'the movie channel group 310' which is the highest class of 'the melodrama movie channel group 313', may be selected.

Meanwhile, in the above exemplary embodiments, a group zapping command is input while a user is watching a broadcast channel included in a channel group selected by the user, but this is only an example. The technical feature of the exemplary embodiments may also be applied when a group zapping command is input while a user is watching a broadcast channel included in another channel group which is not selected by the user.

For example, as in the case illustrated in FIG. 5A, if a user inputs the first group zapping in sequence while watching a channel included in 'the action movie channel group 311', broadcast channels included in 'the weekday drama channel group 321' and 'the weekend drama channel group 322' may be selected in sequence.

Figure 6A:
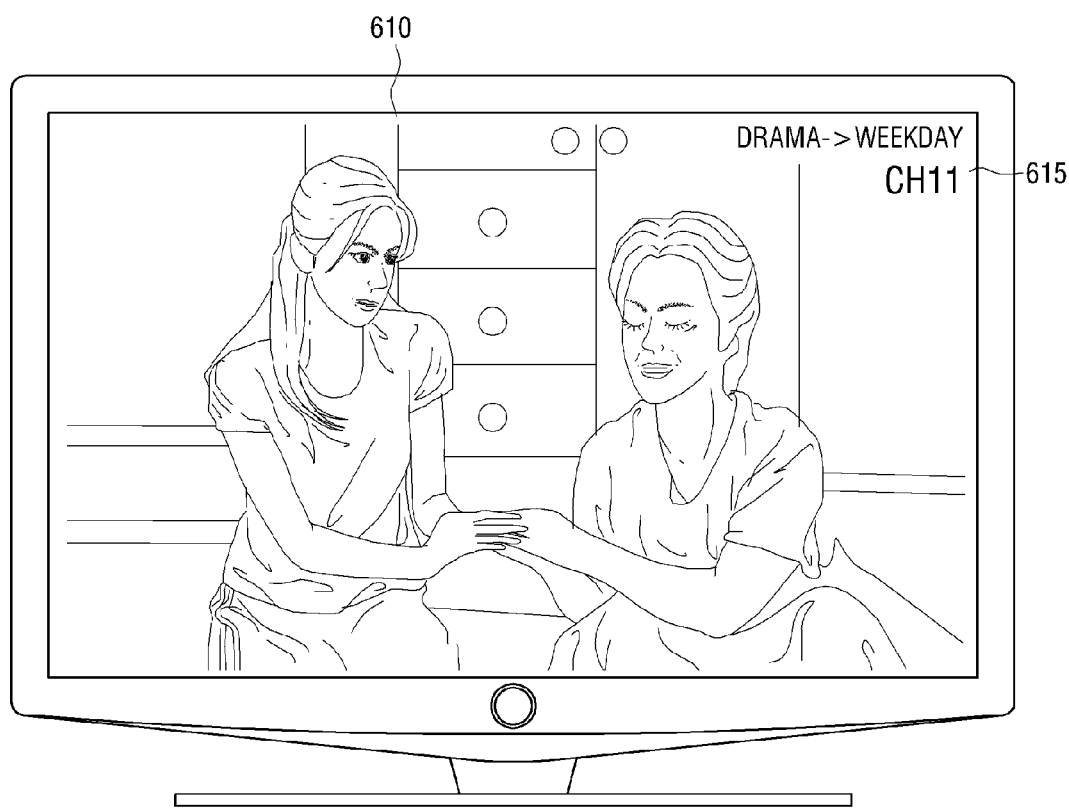
FIGS. 6A to 6C are views to explain an operation of a broadcast receiving apparatus performing group zapping in detail according to another exemplary embodiment.
Figure 6B:
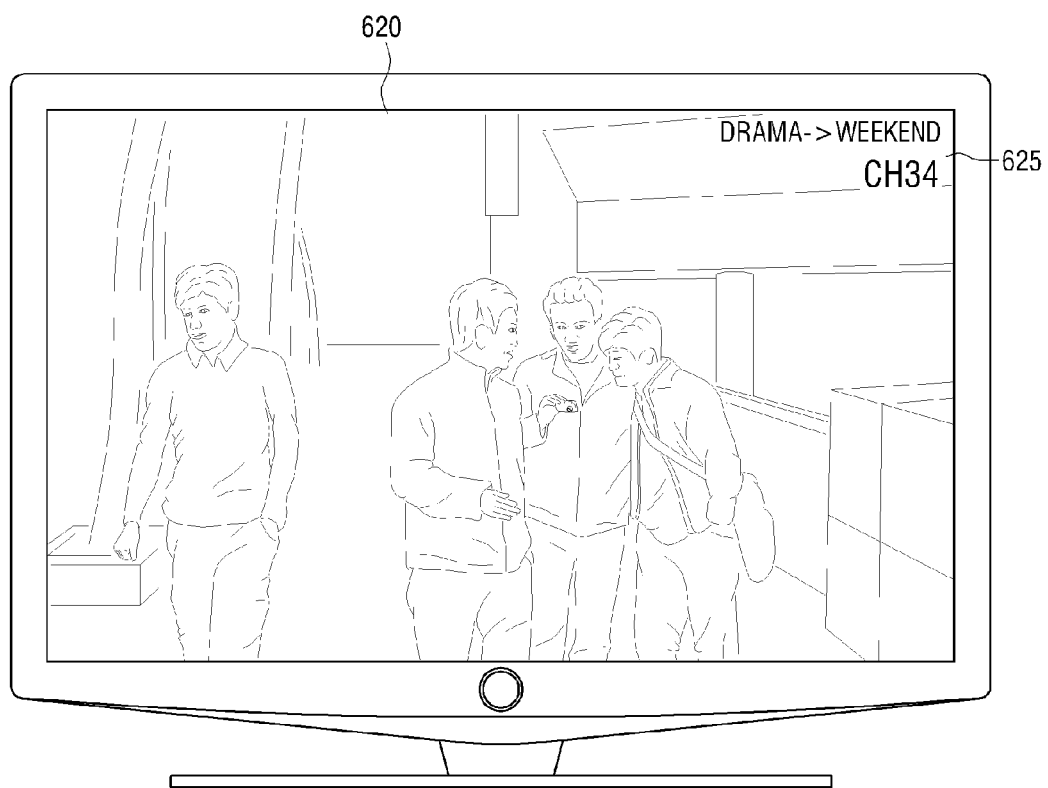
Figure 6C:
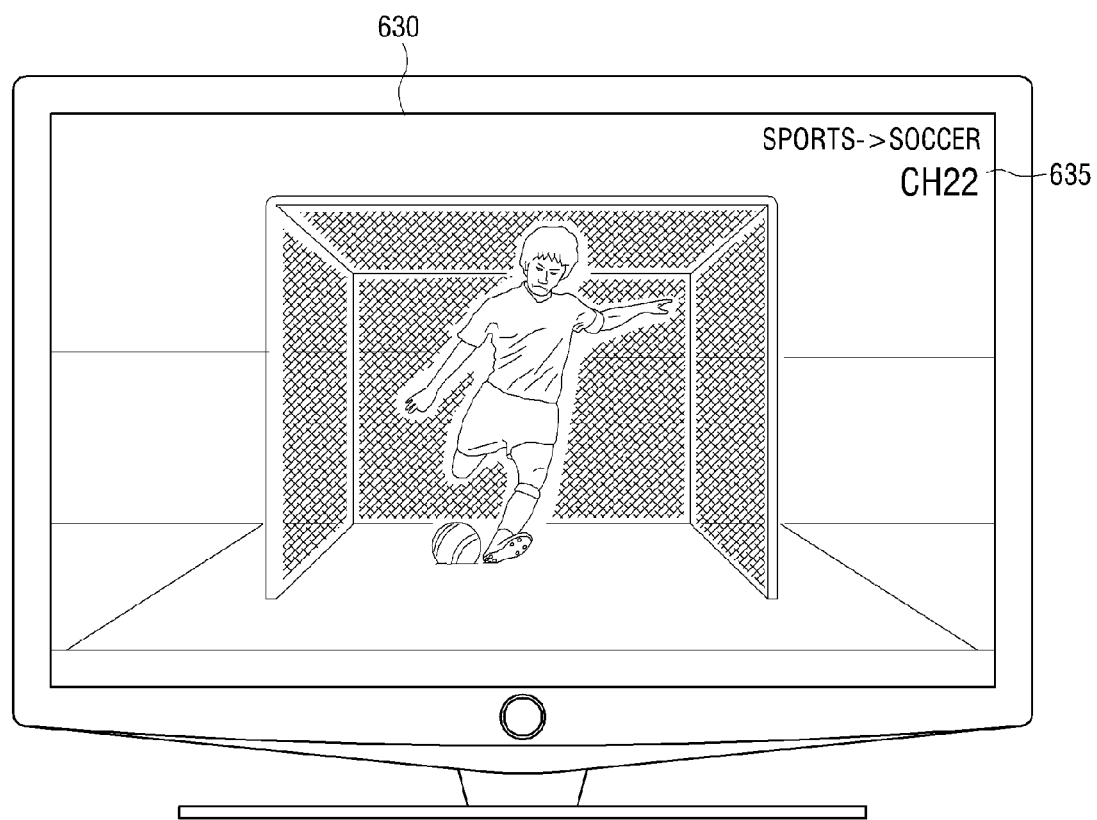

FIGS. 6A to 6C are views to explain an operation of a broadcast receiving apparatus performing group zapping in detail according to another exemplary embodiment. As explained with regard to FIGS. 5A and 3B, it will be assumed that a user selects 'the weekday drama channel group' and is watching a broadcast channel included in 'the weekday drama channel group'.

As illustrated in FIG. 6A, a user is watching a channel included in 'the weekday drama channel group' and an image 610 corresponding to the selected channel is displayed on the screen. In addition, 'drama→weekday' is displayed on the upper right portion 625 of the screen to display at least one of class and genre of the current channel along with the channel number. However, it is noted that this information is temporarily displayed or recalled by pressing a predetermined button on a remote control or by performing a specific function, such as a voice command of a user.

FIG. 6B is a view illustrating a case where a group zapping command is input while a user is watching a channel as illustrated in FIG. 6A. As illustrated in FIG. 6B, a channel in 'the weekend drama channel group 322' in the same genre and class as a current channel or a channel group selected by the user is selected according to the group zapping command, and a corresponding image is displayed on the screen 620. Meanwhile, 'drama→weekend' which corresponds to the changed channel group is displayed on the upper right portion 625 of the screen along with the channel number, in this case CH34.

FIG. 6C is a view illustrating a case where a group zapping command is input when the user is viewing the screen illustrated in FIG. 6B. As illustrated in FIG. 6C, a channel in another channel group is selected according to the group zapping command. However, the next channel group after 'the weekend drama channel group' is a channel group included in another genre, a channel included in 'the sports channel group 330' which is the highest class of the next channel group of 'the weekend drama channel group 322' may be selected and a corresponding image may be displayed on the screen 630. Meanwhile, 'sports' which corresponds to the changed channel group may be displayed on the upper right portion 635 of the screen along with the channel number, in this case CH22.

Meanwhile, in the above exemplary embodiment, if a channel zapping command is input while a user is watching a channel of a channel group within a target for group zapping, a channel in another channel group within the target for channel group zapping is selected, but this is only an example. A channel of a channel group within the target for channel group zapping may also be selected when a group zapping command is input while a user is watching a channel in a channel group which is not within the target for group zapping.

In addition, when a channel in another channel group is selected according to a group zapping command, the channel selected first is predetermined. In some cases, a channel in another channel group having the closet channel number to a current channel may be selected first.

Since group zapping and channel zapping are performed in a similar way to the above-described method, detailed explanation will not be provided.

Figure 7:
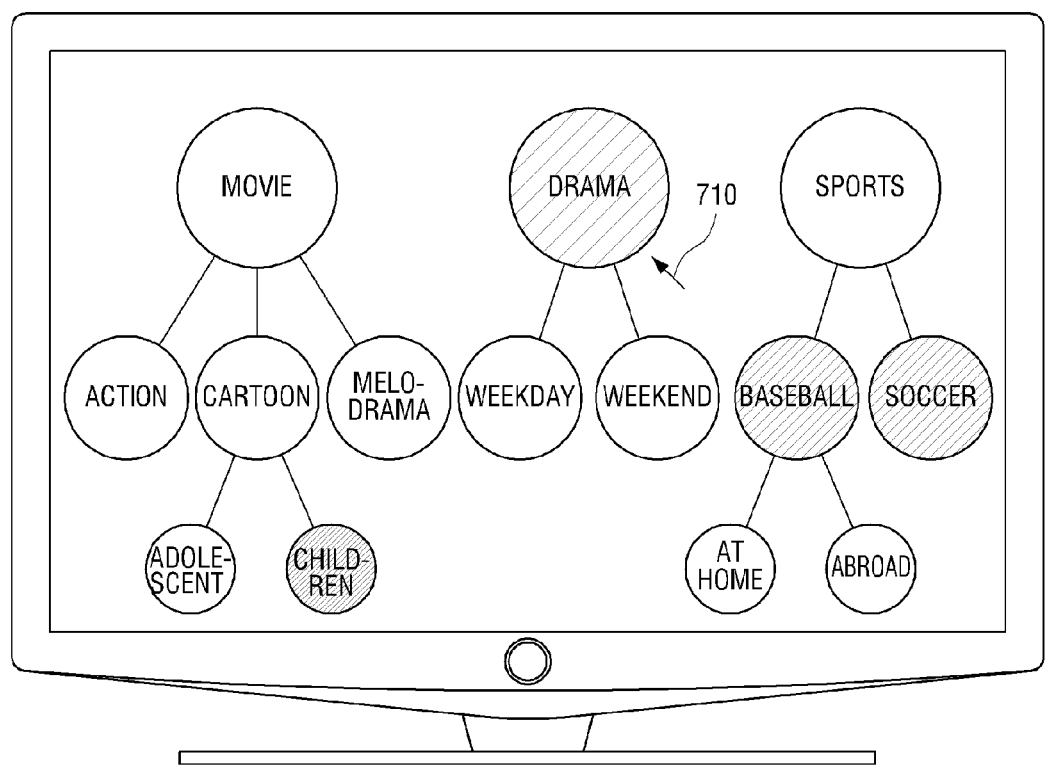
FIG. 7 is a view illustrating an interface window to set a group zapping range according to an exemplary embodiment.

FIG. 7 is a view illustrating an interface window to set a group zapping range according to an exemplary embodiment.

As illustrated in FIG. 7, if a plurality of channel groups classified by genre are displayed on the screen, a user selects a plurality of channel groups, that is, 'a child cartoon movie channel group', 'a drama channel group', 'a baseball channel group' and 'a soccer channel group' from among a plurality of channel groups by moving a cursor 710 on a display using the input unit (190 of FIG. 2) or the external input apparatus 200 and set the plurality of selected channels as a target for group zapping.

Meanwhile, in the above exemplary embodiment, a channel group is selected by controlling a cursor, but this is only an example. A channel group may be highlighted and the highlighted channel group may be selected.

Figure 8:
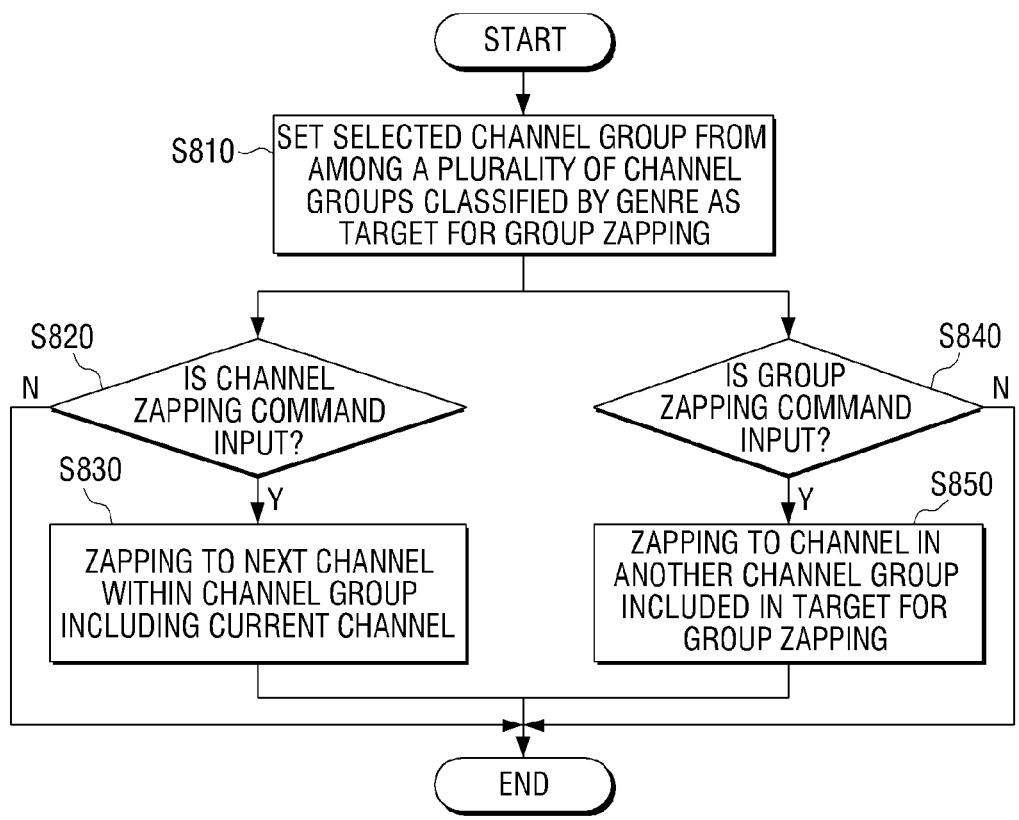
FIG. 8 is a flowchart to explain a method for performing group zapping according to an exemplary embodiment.

FIG. 8 is a flowchart to explain a method for performing group zapping according to an exemplary embodiment.

First of all, channel groups selected from among a plurality of channel groups classified by genre are set as a target for group zapping (S810).

Subsequently, if a zapping command to perform channel zapping is input (S820-Y), channel zapping is performed to a next channel in a channel group to which a current channel belongs (S830). If a group zapping command to perform channel group zapping is input (S840-Y), channel zapping is performed to a channel in another channel group included in a target for group zapping (S850).

Herein, the another channel group may correspond to the highest class or a sub class which belongs to the highest class in each genre.

In this case, if a selection command is input while a user is watching a channel, a channel group to which the current channel belongs may be set as a target for group zapping.

In addition, a group selection screen indicating a channel group name in the highest class and a channel group name in at least one of the sub classes in each group may be displayed and a selected channel group on the group selection screen may be set as a target for group zapping.

Meanwhile, in step S810, after user authentication is performed, a predetermined channel groups may be set as a target for group zapping according to the authenticated user.

In addition, a group zapping command may include a first group zapping command to perform group zapping in the first direction and a second group zapping command to perform group zapping in the second direction which is opposite to the first direction.

In this case, if the first group zapping command or the second group zapping command is input, another channel group which is in a direction corresponding to the input group zapping command within in a target for group zapping may be selected and zapping may be performed to channel in the another channel group.

In addition, a group zapping command may be generated based on movement information of an external input apparatus.

Meanwhile, an image corresponding to a channel which is selected according to at least one of a zapping command and a group zapping command may be displayed on a screen, and in this case, at least one of class and genre to which the selected channel belongs may be displayed on one portion of the screen.

Figure 9:
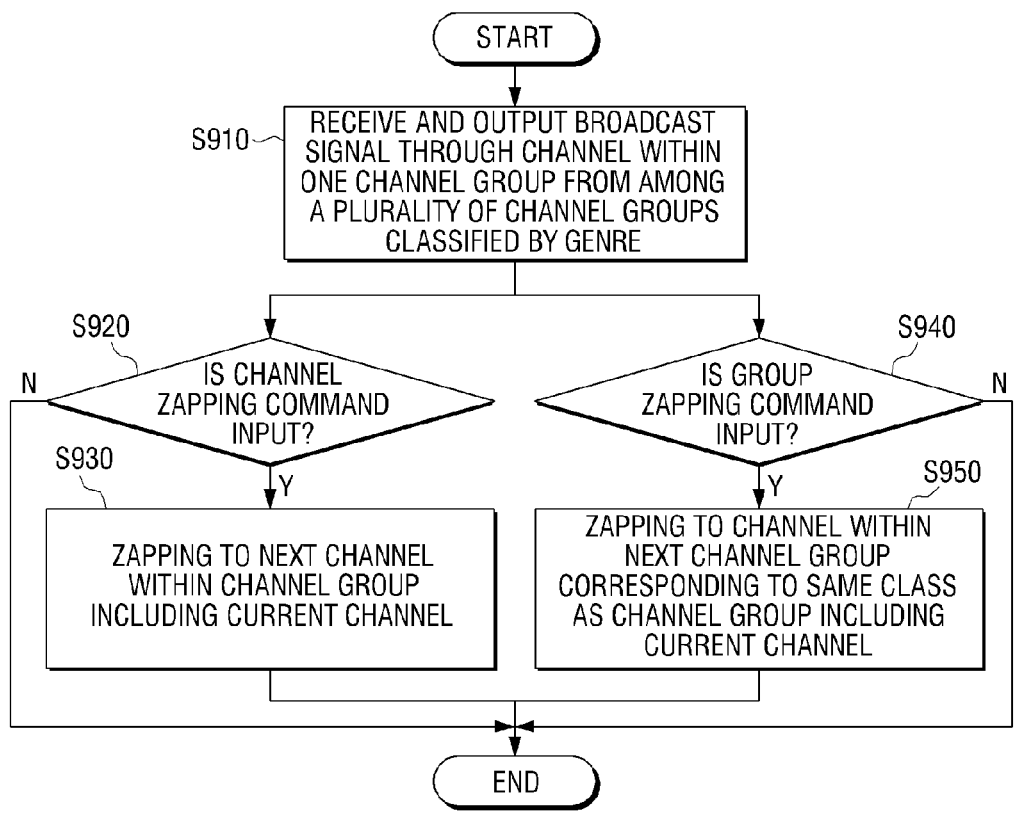
FIG. 9 is a flowchart to explain a method for performing group zapping according to another exemplary embodiment.

FIG. 9 is a flowchart to explain a method for performing group zapping according to another exemplary embodiment.

First of all, a broadcast signal is received and output through a channel in a channel group within a plurality of channel groups classified by genre (S910).

Subsequently, if a channel zapping command is input (S920-Y), channel zapping may be performed to a next channel in a channel group to which a current channel belongs (S930). If a group zapping command is input (S940-Y), channel zapping may be performed to a channel in a next channel group in the same class as the channel group to which the current channel belongs (S950). Herein, the next channel group may correspond to the highest class or a sub class which belongs to the highest class in each genre.

In this case, a user's voice is received to select at least one channel group from among a plurality of channel groups, and if a group zapping command is input, zapping may be performed to a channel in a next channel group in the same class as a channel group selected by the user's voice.

Meanwhile, a group zapping command may include a first group zapping command to perform group zapping in the first direction and a second group zapping command to perform group zapping in the second direction which is opposite to the first direction.

In this case, if the first group zapping command or the second group zapping command is input, a next channel group which is in a direction corresponding to the input group zapping command within in a target for group zapping may be selected and zapping may be performed to channel in the next channel group.

FIG. 10 is a flowchart to explain a method for performing group zapping according to another exemplary embodiment.

According to FIG. 10, each of a plurality of channels is allocated to a plurality of channel groups which are classified by genre according to a user's preference (S1010).

Subsequently, a channel group selected from among a plurality of channel groups by a user is set as a target for group zapping (S1020).

Afterwards, if a zapping command to perform channel zapping is input (S1030-Y), channel zapping is performed to a next channel in a channel group to which a current channel belongs (S1040). If a group zapping command to perform channel group zapping is input (S1050-Y), channel zapping is performed to a channel in another channel group included in a target for group zapping (S1060).

In this case, step S1010 may include analyzing context information of a user, determine the user's preference regarding each of the plurality of channels, and classify the plurality of channels into preferred channels and non-preferred channels.

Herein, the context information may include viewing history information or usage history information regarding a broadcast receiving apparatus. As the viewing history information and the usage history information have already been explained above, detailed description will not be provided.

The above methods may be realized using a broadcast receiving apparatus according to an exemplary embodiment, and also be realized using a broadcast receiving apparatus which does not have all components of the broadcast receiving apparatus according to an exemplary embodiment.

The inventive concept may include a non-transitory computer reading and recording medium having a program for performing the method of providing the UI contents of an image forming apparatus. The non-transitory computer reading and recording medium includes all kinds of recording apparatuses which store data readable by a computer system. The examples of the non-transitory computer reading and recording medium include a ROM, a RAM, a CD-ROM, a magnetic tape, a floppy disk, and an optical data storing apparatus. The non-transitory computer reading and recording medium is distributed to a computer system connected through a network, and a code readable by a computer through a distribution method may be stored in the media and performed.

Although a few exemplary embodiments have been shown and described, it would be appreciated by those skilled in the art that changes may be made to the exemplary embodiments without departing from the principles and spirit of the inventive concept, the scope of which is defined in the claims and their equivalents.

What is claimed is:

1. A method for performing channel zapping comprising:
    setting a channel group selected from among a plurality of channel groups classified by genre as a target for group zapping; and
    performing zapping to a next channel in a first channel group to which a current channel belongs, if a channel zapping command is input, and performing channel zapping to a channel in a second channel group that is different from the first group and is included in the target for group zapping, if a group zapping command that is different from the channel zapping command is input,
    wherein the second channel group is a channel group in a highest class or in a sub class which belongs to the highest class in each genre.

2. The method as claimed in claim 1, wherein the setting the channel group comprises, setting the first channel group to which the current channel belongs as the target for group zapping, if a selection command is input while a user is watching a channel.

3. The method as claimed in claim 1, wherein the setting the channel group comprises:
    displaying a group selection screen indicating a channel group name in the highest class and a channel group name in at least one of the sub classes in each group; and
    setting the channel group selected from the group selection screen as the target for group zapping.

4. The method as claimed in claim 1, wherein the setting the channel group further comprises:
    performing user authentication and setting predetermined channel groups as the target for group zapping according to an authenticated user.

5. The method as claimed in claim 1, wherein the group zapping command includes a first group zapping command to perform group zapping in a first direction and a second group zapping command to perform group zapping in a second direction which is opposite to the first direction,
    wherein the zapping comprises, selecting another channel group which is in a direction corresponding to an input group zapping command within the target for group zapping and performing zapping to channel in the another channel group, if the first group zapping command or the second group zapping command is input.

6. The method as claimed in claim 1, wherein the group zapping command is generated based on movement information of an external input apparatus.

7. The method as claimed in claim 1, further comprising:
    displaying an image corresponding to a channel selected according to at least one of the zapping command and the group zapping command on a screen,
    wherein at least one of class and genre to which the selected channel belongs is displayed on one portion of the screen.

8. A method for performing channel zapping comprising:
    receiving a user's command to select a channel group from among a plurality of channel groups classified by genre; and
    performing channel zapping to a next channel in a first channel group to which a current channel belongs, if a channel zapping command is input, and performing channel zapping to a channel in a second channel group that is different from the first channel group and is included in the selected channel group in a same class as the selected channel group, if a group zapping command that is different from the channel zapping command is input,
    wherein the second channel group is a channel group in a sub class which belongs to a highest class in each genre.

9. The method as claimed in claim 8, wherein the receiving the user's command comprises receiving a user's voice to select at least one channel group from among the plurality of channel groups,
    wherein the channel zapping comprises, performing zapping to a channel in the second channel group in a same class as the channel group selected by the user's voice, if a group zapping command is input.

10. The method as claimed in claim 8, wherein the group zapping command includes a first group zapping command to perform group zapping in a first direction and a second group zapping command to perform group zapping in a second direction which is opposite to the first direction,
    wherein the channel zapping comprises, selecting another channel group which is in a direction corresponding to an input group zapping command within a same class in each genre and performing zapping to a channel in the another channel group, if the first group zapping command or the second group zapping command is input.

11. The method as claimed in claim 8, wherein when the channel in the next channel group is selected according to the group zapping command, a first selected channel in the another group is a predetermined channel.

12. The method as claimed in claim 8, wherein when the channel in the next channel group is selected according to the group zapping command, a first selected channel in the next group is a channel having a closest channel number to the current channel.

13. A broadcast receiving apparatus comprising:
a receiving unit which selects a broadcast channel and receives a broadcast signal;
an input unit which receives a user's command;
a setting unit which sets a channel group selected from among a plurality of channel groups classified by genre as a target for group zapping; and
a control unit which controls the receiving unit to select a next channel in a channel group to which a current channel belongs if a channel zapping command is input, and to select a channel in a next channel group that is different from the channel group to which the current channel belongs and is included in the target for group zapping if a group zapping command that is different from the channel zapping command is input,
wherein the next channel group is a channel group in a highest class or in a sub class which belongs to the highest class in each genre.

14. The apparatus as claimed in claim 13, wherein the setting unit sets the channel group to which the current channel belongs as the target for group zapping, if a selection command is input while a user is watching a channel.

15. The apparatus as claimed in claim 13, further comprising:
a display unit which displays a group selection screen indicating a channel group name in a highest class and a channel group name in at least one of sub classes in each group; and
the setting unit sets the channel group selected from the group selection screen as the target for group zapping.

16. The apparatus as claimed in claim 13, wherein the control unit controls the setting unit to perform user authentication and set predetermined channel groups as the target for group zapping according to an authenticated user.

17. The apparatus as claimed in claim 13, wherein the group zapping command includes a first group zapping command to perform group zapping in a first direction and a second group zapping command to perform group zapping in a second direction which is opposite to the first direction,
wherein the control unit controls the receiving unit to select another channel group which is in a direction corresponding to an input group zapping command within the target for group zapping and perform zapping to a channel in the next channel group if the first group zapping command or the second group zapping command is input.

18. The apparatus as claimed in claim 13, wherein the input unit receives the group zapping command which is generated based on movement information of an external input apparatus.

19. The apparatus as claimed in claim 13, further comprising:
a display unit which displays an image corresponding to a channel selected according to at least one of the zapping command and the group zapping command on a screen,
wherein the control unit controls the display unit to display at least one of class and genre to which the selected channel belongs on one portion of the screen.

20. A broadcast receiving apparatus comprising:
a receiving unit which selects a broadcast channel and receives a broadcast signal;
an input unit which receives a user's command to select a channel group from among a plurality of channel groups classified by genre; and
a control unit which controls the receiving unit to select a next channel in a first channel group to which a current channel belongs if a channel zapping command is input, performs zapping, and selects a channel in a second channel group in a same class as the selected channel group if a group zapping command that is different from the channel zapping command is input,
wherein the second channel group is a channel group in a sub class which belongs to the highest class in the each genre.

21. The apparatus as claimed in claim 20, wherein the input unit receives a user's voice to select at least one channel group from among the plurality of channel groups,
wherein the control unit performs zapping to a channel in the second channel group in a same class as the channel group selected by the user's voice, if the group zapping command is input.

22. The apparatus as claimed in claim 20, wherein the group zapping command includes a first group zapping command to perform group zapping in a first direction and a second group zapping command to perform group zapping in a second direction which is opposite to the first direction,
wherein the control unit selects another channel group which is in a direction corresponding to an input group zapping command within in a same class in each genre and performs zapping to a channel in the second channel group, if the first group zapping command or the second group zapping command is input.

23. A method for performing channel zapping comprising:
allocating each of a plurality of channels to a plurality of channel groups classified by genre according to a user's preference;
setting a channel group selected from among the plurality of channel groups by a user as a target for group zapping; and
performing zapping to a next channel in a first channel group to which a current channel belongs if a channel zapping command is input, and performing channel zapping to a channel in a second channel group that is different from the first channel group and is included in the target for group zapping if a group zapping command that is different from the channel zapping command is input.

24. The method as claimed in claim 23, wherein the allocating each of the plurality of channels according to the user's preference comprises analyzing context information of a user and determining the user's preference regarding each of the plurality of channels.

25. The method as claimed in claim 24, wherein the context information includes at least one of viewing history information or usage history information regarding a broadcast receiving apparatus.

26. A broadcast receiving apparatus comprising:
a receiving unit which selects a broadcast channel and receives a broadcast signal;
an input unit which receives a user's command;
a setting unit which allocates each of a plurality of channels to a plurality of channel groups classified by genre according to a user's preference and sets a channel group selected from among the plurality of channel groups by a user as a target for group zapping; and
a control unit which controls the receiving unit to select a next channel in a channel group to which a current channel belongs if a channel zapping command is input, and to select a channel in a next channel group that is different from the channel group to which the current channel belongs and is included in the target for group zapping if a group zapping command that is different from the channel zapping command is input.

27. The apparatus as claimed in claim 26, wherein the setting unit analyzes context information of a user and determines the user's preference regarding each of the plurality of channels.

28. The apparatus as claimed in claim 27, wherein the context information includes at least one of viewing history information or usage history information regarding a broadcast receiving apparatus.

* * * * *